No. 848,267. PATENTED MAR. 26, 1907.
I. W. SCHMIDT & H. R. SCHWEINLER.
MOTOR DRIVEN VEHICLE.
APPLICATION FILED OCT. 23, 1905.

WITNESSES: INVENTORS:

UNITED STATES PATENT OFFICE.

IDA W. SCHMIDT, OF DETROIT, MICHIGAN, AND HENRY R. SCHWEINLER, OF BROOKLYN, NEW YORK; SAID SCHWEINLER ASSIGNOR TO SAID SCHMIDT.

MOTOR-DRIVEN VEHICLE.

No. 848,267.        Specification of Letters Patent.        Patented March 26, 1907.

Application filed October 23, 1905. Serial No. 283,919.

*To all whom it may concern:*

Be it known that we, IDA W. SCHMIDT and HENRY R. SCHWEINLER, citizens of the United States, and residents, respectively, of Detroit, in the county of Wayne and State of Michigan, and Brooklyn, in the county of Kings and State of New York, have invented new and useful Improvements in Motor-Driven Vehicles, of which the following is a specification.

Our invention relates to that class of light vehicles designed for carrying loads of one or two persons under conditions in which the expenditure of a large amount of power is not required.

The principal object of the invention is to construct a vehicle of this character in the lightest possible manner consistent with the strength required. Any means may be employed for seating purposes; but our vehicle has been especially designed for mounting thereon a wicker chair, like those commonly used at seaside resorts, and which have heretofore either been pushed by hand or propelled by bicycle mechanism.

Further objects of the invention will appear below.

For the purpose of illustrating our invention we have shown in the accompanying drawings, which constitute a part of this specification, a light vehicle having a frame capable of supporting one or two persons and driven by a storage battery or other source of power.

Figure 1:
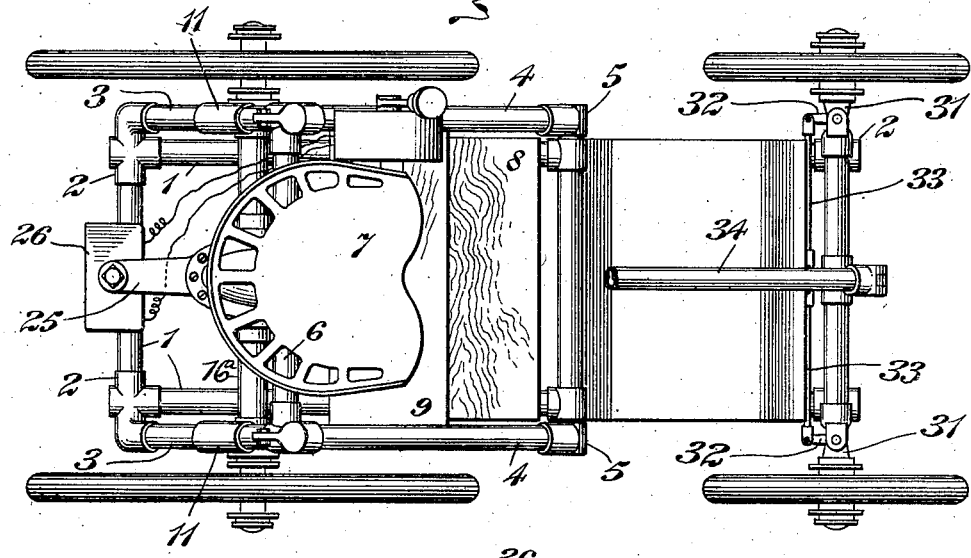
Figure 2:
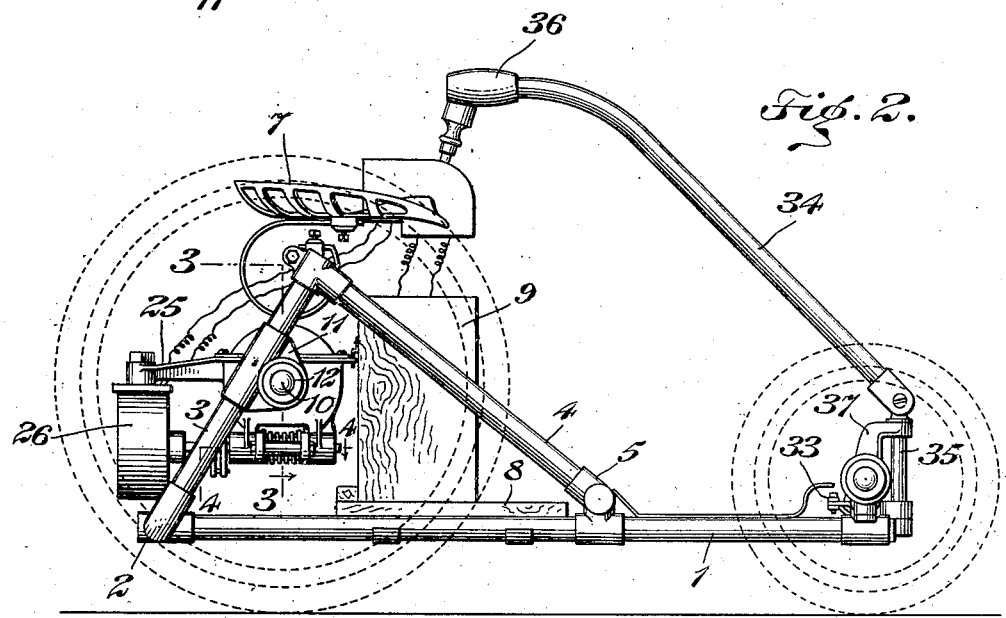

In the drawings, Figure 1 is a plan of the vehicle which we have chosen for illustrating our invention. Fig. 2 is a side elevation of the same.

The body of the vehicle is shown as a main rectangular body formed by a series of tubes 1, secured together at the corners by fittings 2 or the like. From the rear fittings a pair of tubes 3 extend upwardly at a convenient angle, and at their upper ends they are connected with a second pair of tubes 4, which are also placed in an inclined position and are connected by fittings 5 with the side tubes at a point preferably a little forward of the center of the body of the vehicle. The tubes 3 and 4 are suitably connected at their upper ends and constitute struts to support a tube 6, which passes across the body of the vehicle. This latter tube is designed to support the load carried by the vehicle, and we have shown a seat 7 as being mounted upon it, although, as before stated, it is expected that the seat will usually take the form of a chair.

It will be observed that a load being applied at the apex of the triangle formed by the side tubes and the struts 3 and 4 the strains will be transmitted to the body of the frame through the inclined parts thereof and will be most efficiently sustained thereby. The strains will come at points on the frame which will be amply able to support them, and by constructing the supporting part of the vehicle in this manner extreme lightness can be secured.

Located on a platform 8, on what we have called the "body" of the vehicle, is a casing 9 for a storage battery or other source of power. The tubes 3 have been employed for supporting the motive power of the vehicle and for carrying the divided axle or shaft 10, with which the driving-wheels are connected. For this purpose a bracket 11 is mounted on each of the tubes 3, the brackets being provided with bearings 12 for the shaft. Extending between the bearings 11 is a tubular shaft or frame member 16$^a$, through which the aforesaid shaft 10 extends. Said frame member 16$^a$ supports a bracket 25, and this bracket in turn supports a motor 26, which is preferably electric and driven by energy derived from the apparatus in the casing 9. Motion is transmitted by gearing 21 from said motor 26 to the shaft 10, by which to drive the traction-wheels fastened on said shaft, as shown. The operation of the motor is controlled by an electrical controller of any desired form, (illustrated in outline at 22 in the drawings.)

For the purpose of steering the vehicle we have provided a pair of knuckles 31, pivoted upon the frame, and each having an arm 32. These arms are connected by links 33, which are pivotally connected with the lever 34, this lever being mounted on a vertical shaft 35, with which an operating-handle 36 is connected. A bracket 37 is provided for supporting the vertical shaft 35.

What we claim as our invention, and desire to secure by Letters Patent, is—

1. In a motor-vehicle the combination of a rigid frame-body, forwardly inclined rear struts rising from the same, rearwardly-inclined struts rising from an intermediate portion of the frame-body and having their upper ends joined rigidly to the upper ends of the rear struts, a horizontal connection rigidly joining the upper ends of the struts at each side of the frame, a seat sustained on said horizontal connection, a horizontal tubular frame member extending between the rear struts below their upper ends, an axle extending through said tubular frame member, traction-wheels on the axle, a motor also sustained on said tubular frame member and means for driving the axle from said motor.

2. In a motor-vehicle the combination of a frame-body extending essentially horizontally, an inverted-V-shaped frame structure mounted on the rear portion of the body and rising therefrom, a seat sustained at the upper part of said frame portion, a tubular frame member, carried horizontally by said inverted-V-shaped frame structure, an axle extended through said tubular frame member and gearing for driving the axle from said motor.

In testimony whereof we have signed our names to this specification in the presence of two subscribing witnesses.

IDA W. SCHMIDT.
HENRY R. SCHWEINLER.

Witnesses:
WALTER LAMBERT,
GRACE BROWN.